(12) United States Patent
Aoki (10) Patent No.: US 7,548,810 B2
(45) Date of Patent: Jun. 16, 2009

(54) CONTROL APPARATUS FOR CONTINUOUSLY VARIABLE TRANSMISSION OF VEHICLE

(75) Inventor: Akihira Aoki, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 936 days.

(21) Appl. No.: 10/976,885

(22) Filed: Nov. 1, 2004

(65) Prior Publication Data

US 2005/0096822 A1    May 5, 2005

(30) Foreign Application Priority Data

Nov. 4, 2003   (JP) .............................. 2003-374825

(51) Int. Cl.
   *G06G 7/63*   (2006.01)
(52) U.S. Cl. ............................ 701/51; 701/52; 701/55; 701/56; 477/34; 477/37; 477/43; 477/45; 477/46
(58) Field of Classification Search ................... 701/51, 701/55, 56, 52; 477/34, 37, 43, 45, 46
   See application file for complete search history.

(56) References Cited

U.S. PATENT DOCUMENTS

| | | | | |
|---|---|---|---|---|
| 5,609,544 A * | 3/1997 | Lardy et al. | ............ | 477/46 |
| 5,947,861 A * | 9/1999 | Nobumoto | ............ | 477/37 |
| 6,035,735 A * | 3/2000 | Graf et al. | ............ | 74/335 |
| 6,456,918 B2 * | 9/2002 | Nanri | ............ | 701/51 |
| 6,544,141 B1 * | 4/2003 | Fuchs et al. | ............ | 477/44 |
| 6,666,793 B2 * | 12/2003 | Narita et al. | ............ | 477/40 |
| 6,718,247 B1 * | 4/2004 | Graf et al. | ............ | 701/51 |

FOREIGN PATENT DOCUMENTS

| | | |
|---|---|---|
| JP | 60-095255 A | 5/1985 |
| JP | 09-207628 A | 8/1997 |
| JP | 11-257481 A | 9/1999 |
| JP | 2000-002323 A | 1/2000 |
| JP | 2001-097078 A | 4/2001 |

* cited by examiner

*Primary Examiner*—Khoi Tran
*Assistant Examiner*—Nikhil Sriraman
(74) *Attorney, Agent, or Firm*—Arent Fox LLP (57) ABSTRACT

A control apparatus for a continuously variable transmission of a vehicle is provided for switching the transmission from a continuously variable transmission mode to a stepped transmission mode without giving any discomfort to the driver, and for appropriately responding to a request for acceleration from the operator during the stepped transmission mode. The control apparatus comprises an ECU for setting a target transmission ratio in accordance with the detected operating condition of the vehicle, controlling the transmission ratio of the continuously variable transmission to reach the set target transmission ratio, and switching the transmission mode between a CVT mode and an AT mode. When the transmission mode is switched from the CVT mode to the AT mode, the ECU sets the target transmission ratio to a transmission ratio in the CVT mode immediately before the switching. Subsequently, when the engine rotational speed reaches an upper limit rotational speed, the ECU sets the target transmission ratio to a transmission ratio on a high speed side such that the engine rotational speed falls to an up-shift rotational speed.

9 Claims, 9 Drawing Sheets

CONTROL APPARATUS FOR CONTINUOUSLY VARIABLE TRANSMISSION OF VEHICLE

BACKGROUND OF THE INVENTION

1. Field of the Invention

The present invention relates to a control apparatus for a continuously variable transmission of a vehicle which can continuously vary the output of an internal combustion engine equipped in the vehicle.

2. Description of the Prior Art

A conventional control apparatus for a continuously variable transmission of the type mentioned above is known, for example, from Japanese Patent Publication No. 7-102791 and Laid-open Japanese Patent Application No. 2001-355718. The control apparatuses described in these patent documents provide a continuously variable transmission mode and a stepped transmission mode for the continuously variable transmission. In these control apparatuses, the two transmission modes are automatically switched in accordance with a throttle opening indicative of the degree of acceleration required by the operator. Specifically, the continuously variable transmission is set to the continuously variable transmission mode when the throttle opening is smaller than a predetermined value, and is switched from the continuously variable transmission mode to the stepped transmission mode when the operator largely treads down on an accelerator pedal to cause the throttle opening to increase to the predetermined value or more. Then, in the continuously variable transmission mode, a target transmission ratio is continuously set in accordance with the vehicle speed and the like, and the transmission ratio of the continuously variable transmission is continuously controlled to reach the target transmission ratio. In the stepped transmission mode, on the other hand, the continuously variable transmission is controlled by the control apparatus of Japanese Patent Publication No. 7-102791 or Laid-open Japanese Patent Application No. 2001-355718 in the following manner.

First, in the controller of Japanese Patent Publication No. 7-102791, one of a plurality of previously set transmission stages is selected in accordance with the vehicle speed, throttle opening, and the like. Then, the transmission ratio of the continuously variable transmission is controlled on a stage-by-stage basis to reach a target transmission ratio which is a predetermined transmission ratio corresponding to the selected transmission stage. In the control apparatus of Laid-open Japanese Patent Application No. 2001-355718, a target transmission ratio is the sum of a basic transmission ratio equal to the transmission ratio of the continuously variable transmission immediately before the transmission is switched from the variable continuous transmission mode to the stepped transmission mode, and an additional transmission ratio, and the transmission ratio of the continuously variable transmission is controlled to reach the target transmission ratio. The additional transmission ratio, which is set in accordance with the throttle opening and vehicle speed, is set to a predetermined lower limit value when the vehicle speed exceeds a predetermined value, resulting in the target transmission ratio fixed to a constant value. This control apparatus also controls the transmission ratio of the continuously variable transmission such that the rotational speed of the engine does not exceed a predetermined upper limit rotational speed in order to prevent excessive rotation of the engine.

The control apparatuses of Japanese Patent Publication No. 7-102791 and Laid-open Japanese Patent Application No. 2001-355718 suffer from the following problems. In the control apparatus of Japanese Patent Publication No. 7-102791, since the target transmission ratio in the stepped transmission mode is set to a predetermined transmission ratio for each transmission stage, the operator tends to have a discomfort caused by discontinuous switching of the transmission ratio when the transmission is switched from the continuously variable transmission mode to the stepped transmission mode. Also, the control apparatus sets a plurality of transmission stages based on the following map. The map, which takes the vehicle speed on the horizontal axis and the throttle opening on the vertical axis, respectively, sets a boundary of switching between adjacent transmission stages to substantially increase as the vehicle speed is higher, with its slope being smaller toward a higher speed at which a larger transmission stage is set. Thus, when the transmission is switched from one stage to another in the stepped transmission mode using such a map, the boundary is often passed, particularly when moderate acceleration is required, causing frequent switching of the transmission and a resulting degradation in drivability.

In the control apparatus of Laid-open Japanese Patent Application No. 2001-355718, on the other hand, the target transmission ratio is fixed to a constant value when the vehicle speed exceeds a predetermined value, and the transmission ratio of the continuously variable transmission is controlled to prevent the engine rotational speed from exceeding a predetermined upper limit rotational speed, as described above. Therefore, even if moderate acceleration is required, the engine rotational speed continues to increase unless the engine rotational speed reaches the upper limit rotational speed, causing an associated discomfort to the driver. In addition, when a highly accelerating condition continues, the engine rotational speed becomes constant as it reaches the upper limit rotational speed, again causing a discomfort to be given to the driver. Thus, this control apparatus disadvantageously fails to appropriately respond to a request for acceleration from the driver.

SUMMARY OF THE INVENTION

The present invention has been made to solve the problems as mentioned above, and it is an object of the invention to provide a control apparatus for a continuously variable transmission of a vehicle which is capable of switching the transmission from a continuously variable, transmission mode to a stepped transmission mode without giving any discomfort to the driver, and is capable of appropriately responding to a request for acceleration from the driver during the stepped transmission mode.

To achieve the above object, the present invention provides a control apparatus for a continuously variable transmission capable of continuously transmitting the output of an internal combustion engine equipped in a vehicle. The control apparatus is configured to control the transmission ratio of the continuously variable transmission in one of transmission modes including a continuously variable transmission mode for continuously setting the transmission ratio of the continuously variable transmission and a stepped transmission mode for setting the transmission ratio on a step-by-step basis. The control apparatus is characterized by comprising operating condition detecting means for detecting an operating condition of the vehicle; target transmission ratio setting means for setting a target transmission ratio in accordance with a detected operating condition of the vehicle; transmission ratio control means for controlling the transmission ratio of the continuously variable transmission to reach the set target transmission ratio; transmission mode switching means for switching the transmission mode between the continuously variable transmission mode and the stepped transmission mode; and rotational speed detecting means for detecting the rotational speed of the internal combustion engine, wherein the target transmission ratio setting means is operable when the transmission mode is switched from the continuously variable transmission mode to the stepped transmission mode to set the target transmission ratio to a transmission ratio in the continuously variable transmission mode immediately before the switching, and is operable when the rotational speed of the internal combustion engine subsequently reaches a first predetermined value to set the target transmission ratio to a transmission ratio on a high speed side such that the rotational speed of the internal combustion engine is reduced to a second predetermined value smaller than the first predetermined value.

The control apparatus for a continuously variable transmission of a vehicle has the transmission modes for the continuously variable transmission, including the continuously variable transmission mode for continuously setting a transmission ratio of the continuously variable transmission, and a stepped transmission mode for setting the transmission ratio on a stage-by-stage basis. In these continuously variable and stepped transmission modes, a target transmission ratio is set in accordance with a particular operating condition of the vehicle, and the transmission ratio of the continuously variable transmission is controlled to reach the set target transmission ratio. Also, the continuously variable and stepped transmission modes are switched from one to the other in accordance with a particular operating condition of the vehicle. In this event, for switching from the continuously variable transmission mode to the stepped transmission mode, the target transmission ratio is set to a transmission ratio of the continuously variable transmission in the continuously variable transmission mode immediately before the switching. In this way, upon switching from the continuously variable transmission mode to the stepped transmission mode, the transmission mode can be smoothly switched without giving a discomfort to the operator. Subsequently, when the rotational speed of the internal combustion engine increases to a first predetermined value in response to a request for acceleration made by the operator in the stepped transmission mode, the target transmission ratio is set to a transmission ratio on the high speed side such that the rotational speed of the internal combustion engine falls to a second predetermined value smaller than the first predetermined value. In this way, when the rotational speed of the internal combustion engine continues to increase, the transmission ratio of the continuously variable transmission is automatically shifted up, and the rotational speed of the internal combustion engine once decreases in correspondence, and again increases. Thus, unlike before, the rotational sped of the internal combustion engine will not remain constant, but can appropriately respond to a request for acceleration from the operator.

Preferably, in the control apparatus for a continuously variable transmission of a vehicle, the operating condition detecting means includes vehicle speed detecting means for detecting a speed of the vehicle; and load detecting means for detecting a load on the internal combustion engine, wherein the target transmission ratio setting means sets the first and second predetermined values in accordance with at least one of the speed of the vehicle and the load on the internal combustion engine.

According to this preferred embodiment of the control apparatus, the first and second predetermined values are set in accordance with the vehicle speed and/or a load on the internal combustion engine (hereinafter called the "engine load"), so that the transmission ratio of the continuously variable transmission can be appropriately controlled in accordance with the vehicle speed and engine load. For example, when the first predetermined value is set smaller as a request for acceleration is lower, the rotational speed of the internal combustion engine more readily reaches the first predetermined value which is a reference value for the rotational speed of the internal combustion engine at which the transmission ratio should be changed. As a result, the automatic up-shift is more likely to be conducted, so that, unlike before, the operator will not be given a discomfort due to the continuously rising engine rotational speed, for example, when the degree of the request for acceleration is moderate. Further, when the difference between the first and second predetermined values is set at a similar level, for example, irrespective of whether a request for acceleration is high or low, it is possible to reduce the frequency of changing transmission stages during acceleration when a request for acceleration is relatively low. From the foregoing, the drivability can be largely improved.

Preferably, the control apparatus for a continuously variable transmission of a vehicle further comprises target rotational speed setting means for setting a target rotational speed of the internal combustion engine for bringing the transmission ratio of the continuously variable transmission to the target transmission ratio, wherein the transmission mode switching means is operable when the transmission mode is the continuously variable transmission mode to switch the transmission mode to the stepped transmission mode when at least one of the set target rotational speed and the rotational speed of the internal combustion engine exceeds a third predetermined value.

According to this preferred embodiment of the control apparatus, the target rotational speed setting means sets a target rotational speed for bringing the transmission ratio of the continuously variable transmission to the target transmission ratio. Then, when the transmission mode is the continuously variable transmission mode, the transmission mode is switched to the stepped transmission mode when at least one of the set target rotational speed and the rotational speed of the internal combustion engine exceeds the third predetermined value. Therefore, by setting the third predetermined value, for example, to a value suitable for starting the stepped transmission mode, the stepped transmission mode can be started after the rotational speed of the internal combustion engine has sufficiently increased, so that the operator will not given a discomfort caused by the stepped transmission mode which is started before the rotational speed of the internal combustion engine has not sufficiently increased.

Preferably, in the control apparatus for a continuously variable transmission of a vehicle, the operating condition detecting means includes throttle opening detecting means for detecting an opening of a throttle valve of the internal combustion engine, wherein the transmission mode switching means is operable when the transmission mode is the continuously variable transmission mode to prohibit switching to the stepped transmission mode when the opening of the throttle valve is reduced.

According to this preferred embodiment of the control apparatus, when the transmission mode is the continuously variable transmission mode, switching to the stepped transmission mode is prohibited when the opening of the throttle valve is reduced, i.e., the operator has no intention to accelerate, thus making it possible to ensure that the transmission mode is prevented from switching to the AT mode against the operator's will.

Preferably, in the control apparatus for a continuously variable transmission of a vehicle, the vehicle comprises an operating means operated by an operator of the vehicle for changing the transmission ratio of the continuously variable transmission, the operating condition detecting means includes running state detecting means for detecting whether or not the vehicle is in a predetermined starting state, a predetermined stopping state, or a predetermined sudden accelerating state, and whether or not the operating means is in a predetermined operating state, and the transmission mode switching means is responsive to one of the predetermined starting state, stopping state, sudden accelerating state of the vehicle and the predetermined operating state detected by the running state detecting means for prohibiting execution of the stepped transmission mode.

According to this preferred embodiment of the control apparatus, when the running state detecting means detects one of the predetermined starting state, stopping state, and sudden accelerating state of the vehicle and the predetermined operating state, the execution of the stepped transmission mode is prohibited, and the transmission mode is set to the continuously variable transmission mode, thus making it possible to ensure smooth start, stop, sudden acceleration, and manual transmission of the vehicle.

Preferably, in the control apparatus for a continuously variable transmission of a vehicle, the operating condition detecting means includes throttle opening detecting means for detecting the opening of the throttle of the internal combustion engine, wherein the transmission mode switching means is operable when the transmission mode is the stepped transmission mode to switch the transmission mode to the continuously variable transmission mode when the opening of the throttle valve is reduced at the time the rotational speed of the internal combustion engine reaches the first predetermined value.

According to this preferred embodiment of the control apparatus, when the transmission mode is the stepped transmission mode, if the opening of the throttle valve is reduced at the time the rotational speed of the internal combustion engine reaches the first predetermined value, the stepped transmission mode is terminated, and the transmission mode is switched to the continuously variable transmission mode, thus making it possible to appropriately and rapidly respond to the operator's will of deceleration to smoothly decelerate the vehicle.

Preferably, in the control apparatus for a continuously variable transmission of a vehicle, the transmission mode switching means is operable when the transmission mode is the stepped transmission mode to switch the transmission mode to the continuously variable transmission mode when the rotational speed is lower than a fourth predetermined value at the time the rotational speed reaches the second predetermined value.

According to this preferred embodiment of the control apparatus, when the transmission mode is the stepped transmission mode, the transmission mode is switched to the continuously variable transmission mode if the rotational speed is lower than the fourth predetermined value, when the rotational speed of the internal combustion engine reaches the second predetermined value after it has reached the first predetermined value. For example, when the continuously variable transmission is set at a transmission ratio on a relatively high speed side in the stepped transmission mode, the rotational speed of the internal combustion engine can be increased even if the rotational speed of the internal combustion engine falls below the fourth predetermined value in association with the up-shift, causing the transmission mode to transition to the continuously variable transmission mode, thus ensuring a good acceleration feeling.

Preferably, in the control apparatus for a continuously variable transmission of a vehicle, the operating condition detecting means includes vehicle speed detecting means for detecting a speed of the vehicle, and load detecting means for detecting a load on the internal combustion engine, and the control apparatus further comprises correcting means operable when the transmission mode is the stepped transmission mode to correct a rate at which the transmission ratio of the continuously variable transmission changes to the transmission ratio on the high speed side in accordance with at least one of the speed of the vehicle, the load on the internal combustion engine, and the transmission ratio of the continuously variable transmission after the rotational speed of the internal combustion engine has reached the first predetermined value.

According to this preferred embodiment of the control apparatus, when the transmission mode is the stepped transmission mode, the changing rate of the transmission ratio of the continuously variable transmission is corrected in accordance with at least one of the vehicle speed, engine load, and transmission ratio of the continuously variable transmission, so that a good transmission feeling can be provided in accordance with a particular operating condition of the vehicle. For example, when the vehicle speed or engine load (request for acceleration) is relatively high, the transmission ratio is changed at a higher rate to reduce a transmission time, thereby making it possible to rapidly respond to a request for acceleration made by the operator. On the other hand, when the vehicle speed or engine load is relatively low, the transmission ratio is changed at a lower rate to extend a transmission time, thereby making it possible to reduce a transmission shock. Also, for example, since a torque varies more largely as the transmission rate is on a lower speed side, a transmission shock can be reduced by reducing the changing rate.

Preferably, in the control apparatus for a continuously variable transmission of a vehicle, the internal combustion engine comprises a clutch disposed between the internal combustion engine and driving wheels of the vehicle for transmitting a torque of the internal combustion engine to the driving wheels, and the control apparatus further comprises transmitted torque reducing means for reducing the torque transmitted through the clutch during a change to the transmission ratio on the high speed side below the torque applied when such a change is not made.

According to this preferred embodiment of the control apparatus, the torque transmitted through the clutch during a change to the transmission ratio on the high speed side, i.e., during the up-shift, is reduced below the torque applied when the up-shift is not made. In this way, variations in torque can be suppressed during the up-shift, to reduce a transmission shock.

Preferably, the control apparatus for a continuously variable transmission of a vehicle further comprises input torque reducing means for reducing an input torque applied to the continuously variable transmission during a change to the transmission ratio on the high speed side below the input torque applied when such a change is not made.

According to this preferred embodiment of the control apparatus, since the input torque applied to the continuously variable transmission during the up-shift is reduced below the input torque applied when the up-shift is not made, a transmission shock can be reduced, as is the case with the preceding preferred embodiment.

DETAILED DESCRIPTION OF THE EMBODIMENT

Figure 1:
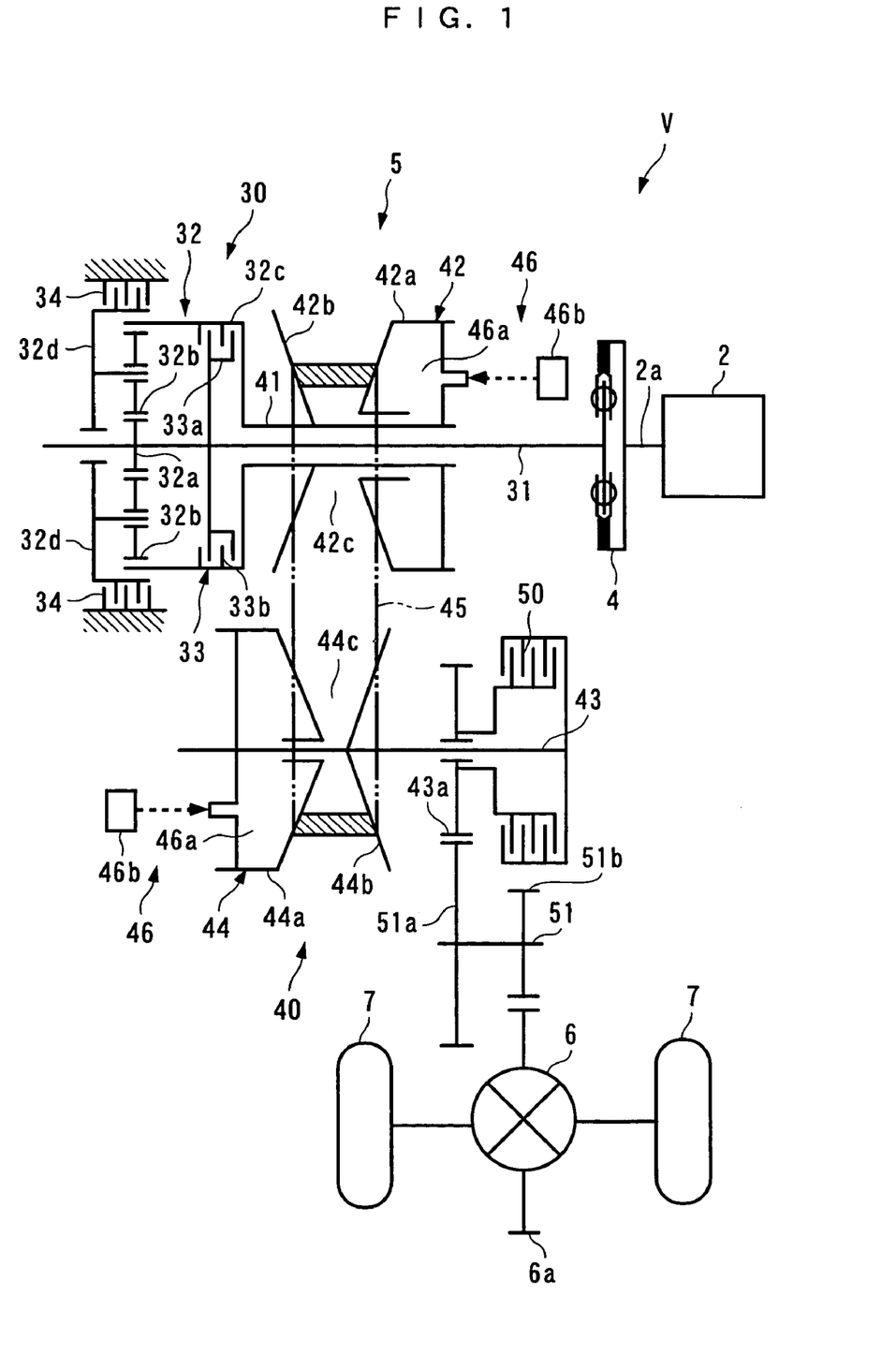
FIG. 1 is a diagram illustrating the configuration of a vehicle driving system including an internal combustion engine and a continuously variable transmission.
Figure 2:
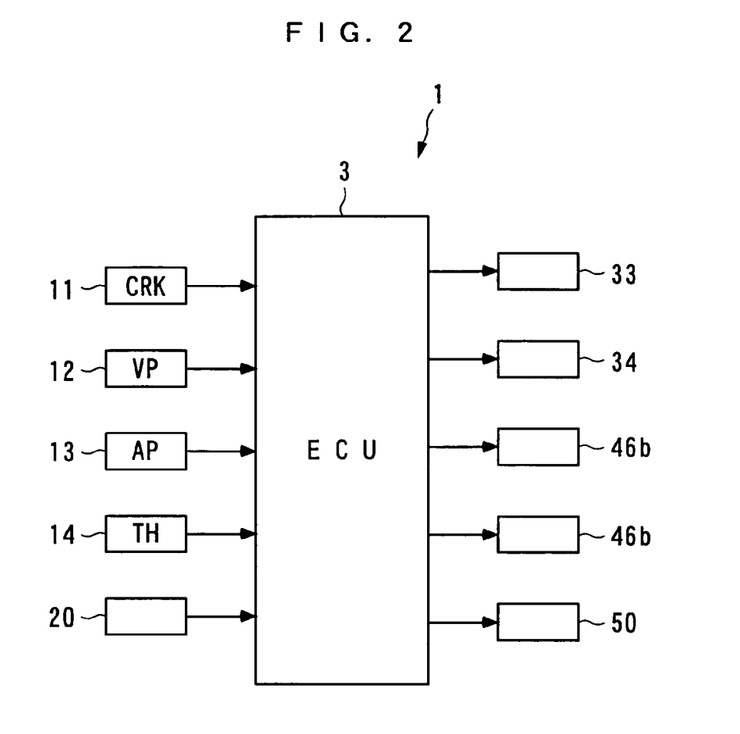
FIG. 2 is a diagram generally illustrating a control apparatus for a continuously variable transmission according to the present invention.

In the following, a preferred embodiment of the present invention will be described in detail with reference to the accompanying drawings. FIGS. 1 and 2 generally illustrate the configuration of a vehicle driving system including a control apparatus for a continuously variable transmission of a vehicle according to the present invention, an internal combustion engine 2, and the like.

The internal combustion engine (hereinafter called the "engine") 2, which is a gasoline engine, is equipped in a vehicle V. The engine 2 is coupled to driven wheels 7 through a fly wheel damper 4, an automatic transmission 5, a differential gear mechanism 6 and the like, so that a torque of the engine 2 is transmitted to the driven wheels 7 through these components 4-6.

The fly wheel damper 4 is coupled to a crank shaft 2a of the engine 2 for transmitting a torque of the engine 2 to the automatic transmission 5 while reducing fluctuations in the torque and attenuating torsional vibrations.

The automatic transmission 5 is comprised of a forward/backward switching mechanism 30, a continuously variable transmission 40, a starting clutch 50, and the like. The forward/backward switching mechanism 30 comprises an input shaft 31, and a planetary gear device 32 attached to the input shaft 31. The input shaft 31 has one end coupled to the fly wheel damper 4, and rotatably extends through a hollow main shaft 41. The planetary gear device 32 is comprised of a sun gear 32a, a carrier 32d for rotatably supporting a plurality of (for example, four) pinion gears in mesh with the sun gear 32a, a ring gear 32c in mesh with each pinion gear 32b, and the like.

The sun gear 32a is integral with the input shaft 31, and a portion of the input shaft 31 closer to the engine 2 than the sun gear 32a is coupled to a clutch inner 33a of a forward clutch 33 which has a clutch outer 33b coupled to the ring gear 32c and main shaft 41. Connection and disconnection of the forward clutch 33 is controlled by an ECU 3, later described. A reverse brake 34 is also coupled to the carrier 32d. The action of the reverse brake 34 is also controlled by the ECU 3.

In the foregoing configuration of the forward/backward switching mechanism 30, when the vehicle V is running forward, the reverse brake 34 is released and the forward clutch 33 is connected in the forward/backward switching mechanism 30, so that the input shaft 31 is directly connected to the main shaft 41, causing the rotation of the input shaft 31 to be directly transmitted to the main shaft 41. Each pinion gear 32b does not rotate about its axis, while the carrier 32d, integral with the input shaft 31, rotates in the same direction. During forward running of the vehicle V, the main shaft 41 is rotated in the same direction as the input shaft 31 at the same rotational speed. On the other hand, during backward running of the vehicle V, the forward clutch 33 is disconnected, and the reverse brake 34 is engaged to lock the carrier 32d, contrary to the foregoing. Consequently, the rotation of the input shaft 31 is transmitted to the ring gear 32c through the sun gear 32a and pinion gears 32b, causing the ring gear 32c and main shaft 41 connected thereto to rotate in the direction opposite to the input shaft 31. In this way, during backward running of the vehicle V, the main shaft 41 rotates in the direction opposite to the input shaft 31.

The continuously variable transmission 40, which is of a belt type, is comprised of the main shaft 41, a driving pulley 42, a counter shaft 43, a driven pulley 44, and the like.

The driving pulley 42 has a frusto-conical movable pulley half 42a and stationary pulley half 42b. The movable pulley half 42a is axially movably and unrotatably attached on the main shaft 41, while the stationary pulley half 42b is fixed to the main shaft 41 and opposes the movable pulley half 42a. Faces of the movable pulley half 42a and stationary pulley half 42b opposing each other are inclined, such that a V-shaped belt groove 42c is formed by the movable pulley half 42a, stationary pulley half 42b and main shaft 41.

The driven pulley 44, which is similar in structure to the driving pulley 42, has a frusto-conical movable pulley half 44a and stationary pulley half 44b. The movable pulley half 44a is axially movably and unrotatably attached on the counter shaft 43, while the stationary pulley half 44b is fixed to the counter shaft 43 and opposes the movable pulley half 44a. Faces of the movable pulley half 44a and stationary pulley half 44b opposing each other are inclined, such that a V-shaped belt groove 44c is formed by the movable pulley half 44a, stationary pulley half 44b and counter shaft 43.

A metal belt 45 is wound around the belt grooves 42c, 44c of both pulleys 42, 44. Each of the movable pulley halves 42a, 44a is provided with a pulley width varying mechanism 46 for moving the movable pulley half 42a or 44a in the axial direction. Each pulley width varying mechanism 46 is comprised of an oil chamber 46a disposed on the back side of the movable pulley half 42a, 44a, an oil pressure control valve 46 for controlling an oil pressure supplied to the oil chamber 46a, and the like. The opening of the oil pressure control valve 46b is controlled by the ECU 3.

In the continuously variable transmission 40 configured as described above, the oil pressure control valve 46b is controlled by the ECU 3 to control the oil pressure in the oil chamber 46a, so that the movable pulley halves 42a, 44a are positioned in accordance with the controlled oil pressure. In this way, the distances between the movable pulley halves 42a, 44a and stationary pulley halves 42b, 44b, i.e., the widths of the belt grooves 42c, 44c can be variably set independently of each other to continuously change a rotational speed ratio between the main shaft 41 and counter shaft 43, thereby continuously controlling the transmission ratio of the continuously variable transmission 40.

As described later, the continuously variable transmission 40 is set to one of the following two transmission modes by the control apparatus 1:

1. a continuously variable transmission mode (hereinafter called the "CVT mode") for continuously setting the transmission ratio in accordance with a particular operating condition of the vehicle V;

2. a stepped transmission mode (hereinafter called the "AT mode") for setting the transmission ratio on a step-by-step basis.

The starting clutch 50 is provided for connecting and disconnecting the gear 43a rotatably disposed on the counter shaft 43 to and from the counter shaft 43, and its operation is controlled by the ECU 3. The starting clutch 50 is also configured to be capable of changing a fastening force of the gear 43a with the counter shaft 43 by an actuator, not shown, controlled by the ECU 3. The gear 43a is in mesh with a gear 6a of the differential gear mechanism 6 through a larger idler gear 51a and a smaller idler gear 51b disposed on an idler shaft 51. With the foregoing configuration, as the starting clutch 50 is connected, the rotation of the counter shaft 43 is transmitted to the driven wheels 7 through these gears 43a, 51a, 51b and 6a, thereby permitting the vehicle V to start.

Figure 3:
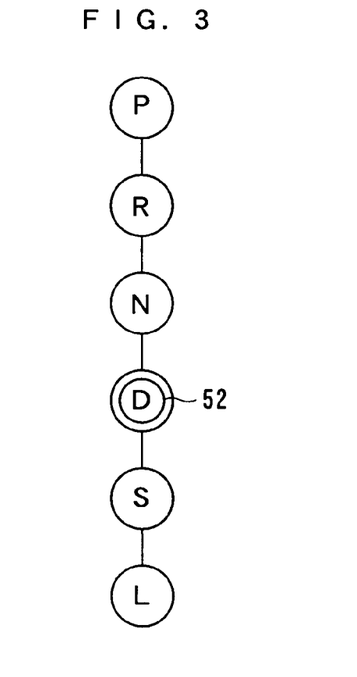
FIG. 3 is a diagram showing a shift range and shift positions of a shift lever.

FIG. 3 illustrates a shift range and shift positions of a shift lever 52 (operating means) operated by the operator. The following ranges are set in the shift lever: Parking (designated by "P" in FIG. 3), Reverse (R), Neutral (N), Drive (D), Sport (S) and Low (L). The shift positions are arranged in this order. In the Sport range, the transmission ratio of the continuously variable transmission 40 is set higher in order to use the engine in a higher rotating condition. The shift lever is also provided with a shift position sensor 20 for detecting the shift position thereof, so that the ECU 3 controls the operation of the aforementioned forward clutch 33, reverse brake 34, pulley width varying mechanism 46 and starting clutch 50 in response to a detection signal from the sensor 20. Further, when the shift lever 52 is operated with the transmission mode of the continuously variable transmission 40 set to the AT mode, the transmission mode is switched to the CVT mode.

The ECU 3 also receives a CRK signal from a crank angle sensor 11 (rotational speed detecting means). The CRK signal is a pulse signal which is outputted every predetermined crank angle as the crank shaft 2a of the engine 2 rotates. The ECU 3 calculates an engine rotational speed NE based on the CRK signal. The ECU 3 further receives a detection signal indicative of a vehicle speed VP of the vehicle V from a vehicle speed sensor 12 (operating condition detecting means), and a detection signal indicative of an opening AP of an accelerator pedal (not shown) trodden down by the operator from an accelerator opening sensor 13 (operating condition detecting means). The ECU 3 also receives a detection signal indicative of an opening TH of a throttle valve (not shown) of the engine 2 (hereinafter called the "throttle opening") from a throttle opening sensor 14 (load detecting means, throttle opening detecting means)

In this embodiment, the ECU 3 implements target transmission ratio setting means, transmission ratio control means, transmission mode switching means, rotational speed detecting means, target rotational speed setting means, throttle opening change detecting means, running condition detecting means, correcting means, transmitted torque reducing means, and input torque reducing means of the present invention. The ECU 3 is based on a microcomputer comprised of an I/O interface, a CPU, a RAM, a ROM and the like. The detection signals from the sensors 11-14 and shift position sensor 20 are A/D converted by the I/O interface before they are inputted to the CPU. The CPU sets the continuously variable transmission 40 to one of the CVT mode and AT mode in response to these detection signals and in accordance with a control program stored in the ROM, and controls the transmission ratio of the continuously variable transmission 40 in accordance with the set transmission mode. The ECU 3 also outputs control signals to an ignition plug and an injector, not shown, of the engine 2 to control an ignition timing and the amount of injected fuel. Further, in the AT mode, the ECU 3 performs an up-shift control for setting the transmission ratio of the continuously variable transmission 40 to a higher side when the engine rotational speed N reaches an upper limit rotational speed NLMT, later described.

In the control apparatus 1 for controlling the continuously variable transmission 40 configured as described above, the transmission mode is normally set to the CVT mode. In this CVT mode, the following CVT mode processing is executed.

Figure 6:
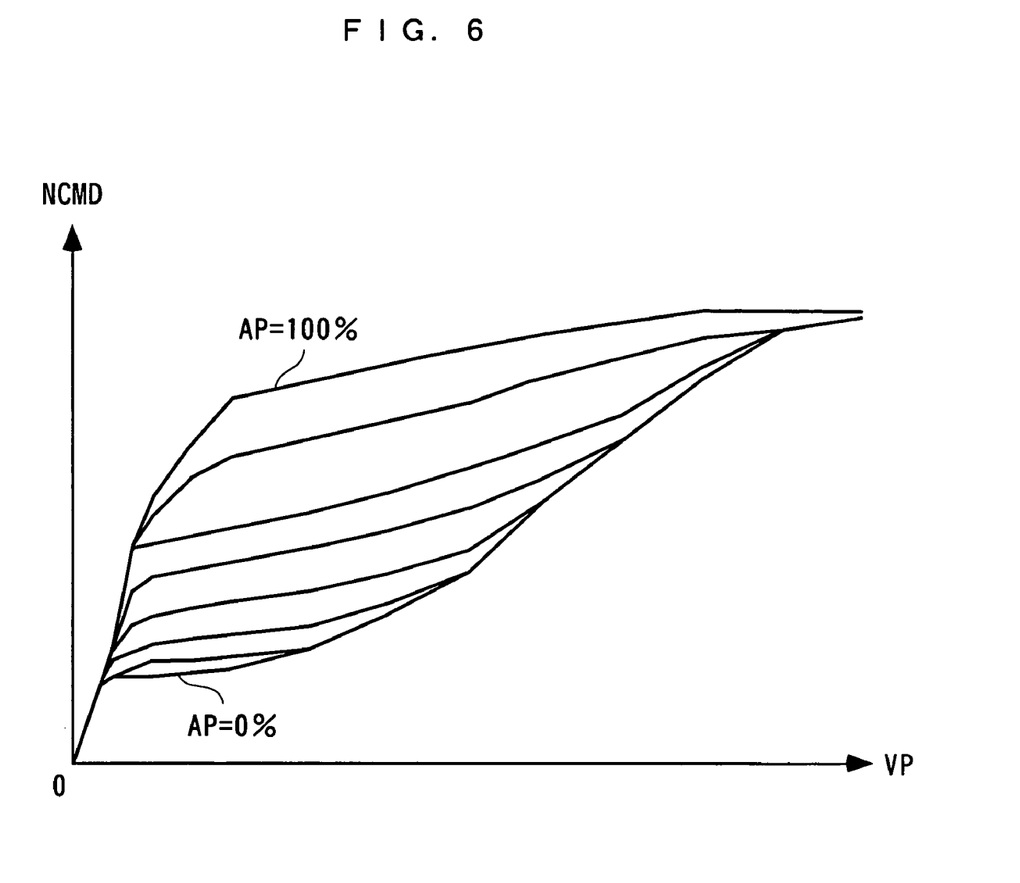
FIG. 6 is a diagram showing an exemplary NCMD table for a CVT mode.

In the CVT mode processing, a target rotational speed NCMD is set in accordance with the vehicle speed VP and accelerator pedal opening AP. The target rotational speed NCMD is set based on an NCMD table for the CVT mode, for example, as shown in FIG. 6. This NCMD table is comprised of a plurality of tables which are set for every predetermined accelerator pedal opening AP within a range of 0% to 100%. When the accelerator pedal opening AP indicates an intermediate value between these values, the target rotational speed NCMD is found by an interpolation. Also, in these tables, the target rotational speed NCMD is set to a larger value as the vehicle speed VP is higher and the accelerator pedal opening AP is larger.

As described above, in the CVT mode, the target rotational speed NCMD is continuously set in accordance with the vehicle speed VP and accelerator pedal opening AP, and the transmission ratio of the continuously variable transmission 40 is set by controlling the continuously variable transmission 40 such that the engine rotational speed NE is equal to the target rotational speed NCMD.

Figure 4:
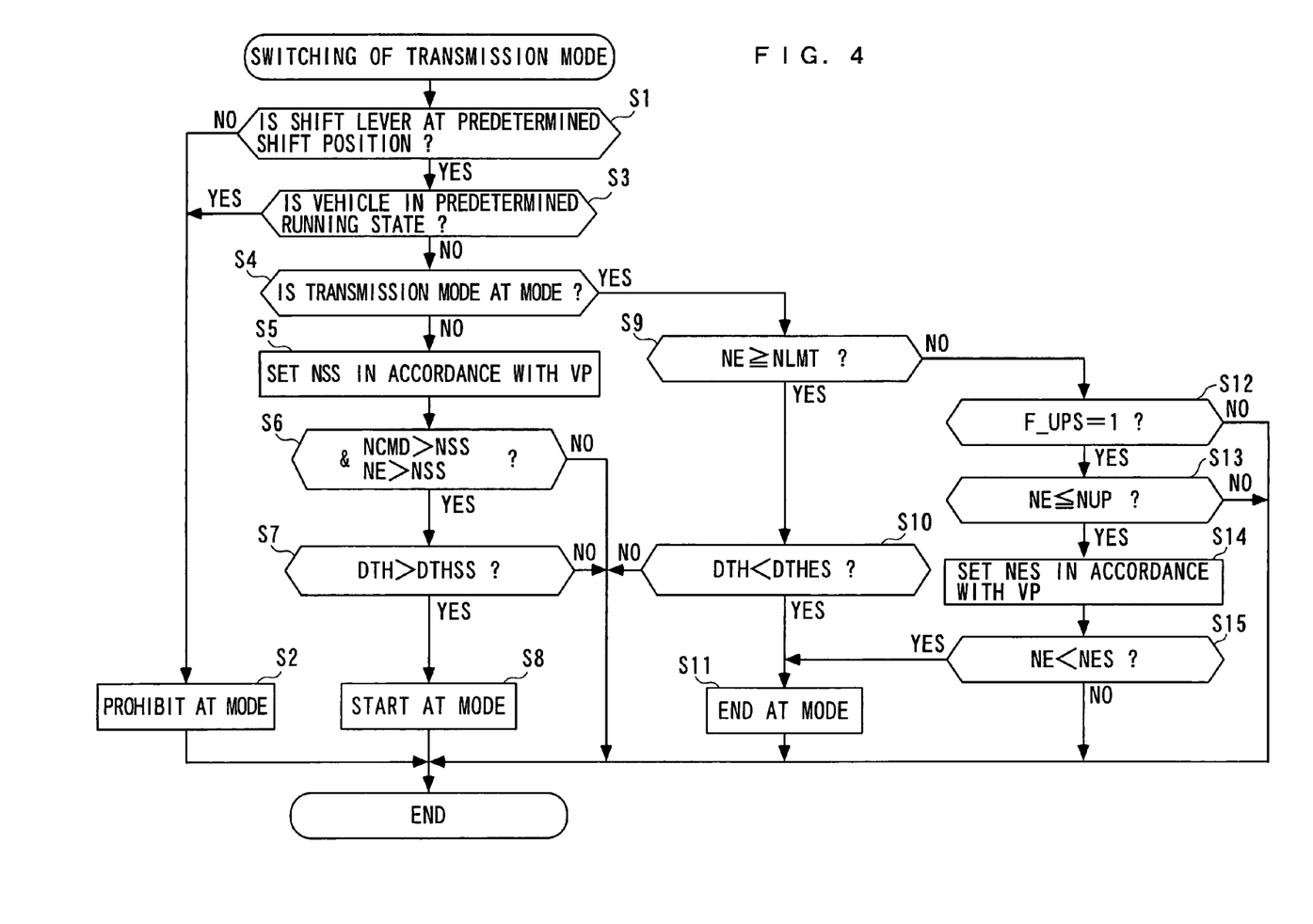
FIG. 4 is a flow chart illustrating a transmission mode switching routine.

FIG. 4 is a flow chart illustrating a transmission mode switching routine for the continuously variable transmission 40. In this routine, it is first determined at step 1 (denoted by "S1" in FIG. 4. This denotation is applied to the following steps as well) whether or not the shift lever 52 remains at a predetermined shift position. Specifically, it is determined whether or not the shift lever 52 remains at any of the drive and sport range shift positions. If the answer is NO, the execution of the AT mode is prohibited (step 2), on the assumption that the operator does not intend to request for acceleration, followed by termination of the routine.

On the other hand, if the answer at step 1 is YES, it is determined whether or not the vehicle V is in a predetermined running state (step 3). The predetermined running state includes a predetermined starting state, stopping state, and suddenly accelerating state of the vehicle V, and a predetermined operated state of the shift lever 52. More specifically, the predetermined starting state refers to the time the vehicle is started or immediately after the starting of the vehicle V; the predetermined stopping state refers to the time the vehicle V is stopping, or immediately before the vehicle V stops; and the predetermined suddenly accelerating state refers to when the accelerator pedal is suddenly trodden down by the operator. Further, the predetermined operated state refers to when the shift lever 52 is switched between the drive range and sport range by the operator, or when the shift lever 52 is switched from these ranges to another range. If the answer at step 3 is YES, indicating that the vehicle V is in the predetermined running condition, the routine proceeds to step 2, where the execution of the AT mode is prohibited, followed by termination of the routine. In this way, in the predetermined running condition, the transmission mode is maintained in the CVT mode, thereby making it possible to ensure smooth starting, stopping, sudden acceleration, and manual transmission of the vehicle V.

If the answer at step 3 is NO, the routine proceeds to step 4, where it is determined whether or not a current transmission mode is the AT mode. If the answer is NO, indicating the CVT mode, an AT mode start rotational speed NSS (third predetermined value) is set in accordance with the vehicle speed VP (step 5), and it is determined at next step 6 whether or not the target rotational speed NCMD and engine rotational speed NE are higher than the AT mode start rotational speed NSS set at step 5. The AT mode start rotational speed NSS is set based on an NSS table, for example, shown in FIG. 7. In the NSS table, the AT mode start rotational speed NSS is set to a constant value when the vehicle speed VP is equal to or lower than a predetermined vehicle speed VP1 (for example, 90 km/h), and is set to suddenly increase when the vehicle speed VP exceeds the predetermined vehicle speed VP1. This is intended to start the AT mode after the engine rotational speed NE has sufficiently increased until the vehicle speed VP reaches the predetermined vehicle speed VP1. During high speed running, where the vehicle speed VP exceeds the predetermined vehicle VP1, the up-shift control by the AT mode, if any, would not provide a clearly perceivable acceleration feeling.

Therefore, if the answer at step 6 is NO, indicating NCMD≦NSS or NE≦NSS, this routine is terminated without further processing, on the assumption that the AT mode should not be started. On the other hand, if the answer at step 6 is YES, it is determined whether or not a changing amount DTH between the current value and previous value of the throttle opening TH is larger than a first predetermined value DTHSS (for example, −10%/sec) (step 7). If the answer is NO, indicating that DTH≦DTHSS, this routine is terminated without further processing to maintain the CVT mode, on the assumption that the changing amount DTH of the throttle opening TH is not large, and a request for acceleration made by the operator is not high. On the other hand, if the answer at step 7 is YES, the AT mode is started (step 8).

Figure 5:
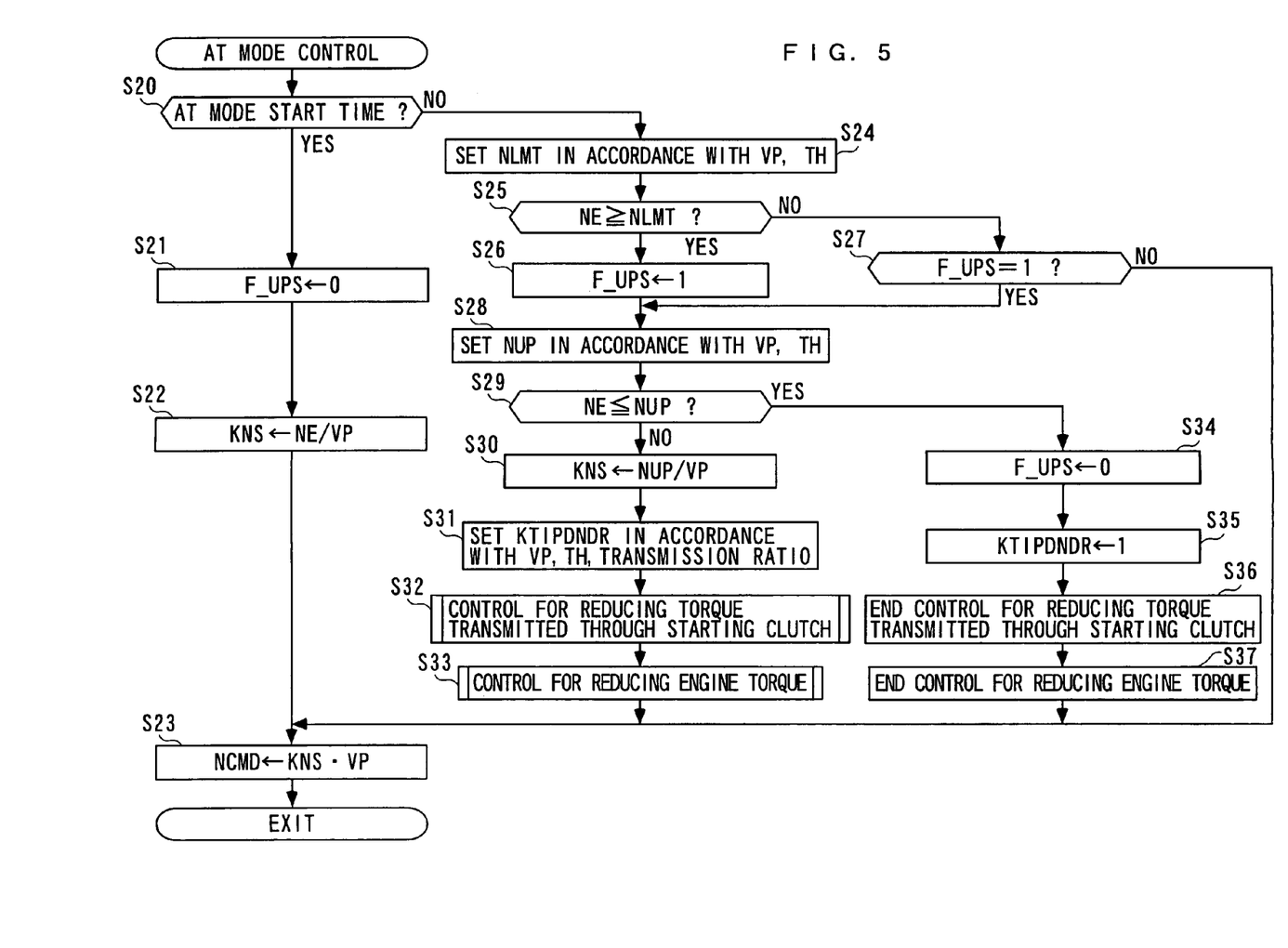
FIG. 5 is a flow chart illustrating a control routine in an AT mode.

FIG. 5 illustrates a control routine in the AT mode. As illustrated in FIG. 5, in this routine, it is first determined at step 20 whether or not the AT mode is started, i.e., immediately after switching from the CVT mode to the AT mode. If the answer is YES, an up-shift flag F_UPS, later described, is set to "0" (step 21). Next, a coefficient KNS is calculated by dividing the engine rotational speed by the vehicle speed V (step 22), and the product of the coefficient KNS and vehicle speed VP is set to a target rotational speed NCMD (step 23), followed by termination of this routine.

In the AT mode, the continuously variable transmission 40 is controlled such that the engine rotational speed NE reaches the target rotational speed NCMD based on the target rotational speed NCMD set at step 23 in the foregoing manner, to control the transmission ratio to a target transmission ratio corresponding to the target rotational speed NCMD. As described above, immediately after the switching to the AT mode, the target rotational speed NCMD is set to a value equal to the engine rotational speed NE in the CVT mode immediately before the switching to the AT mode, and therefore, the target transmission ratio is also set to a value equal to the transmission ratio in the CVT mode immediately before the switching to the AT mode.

Figure 8:
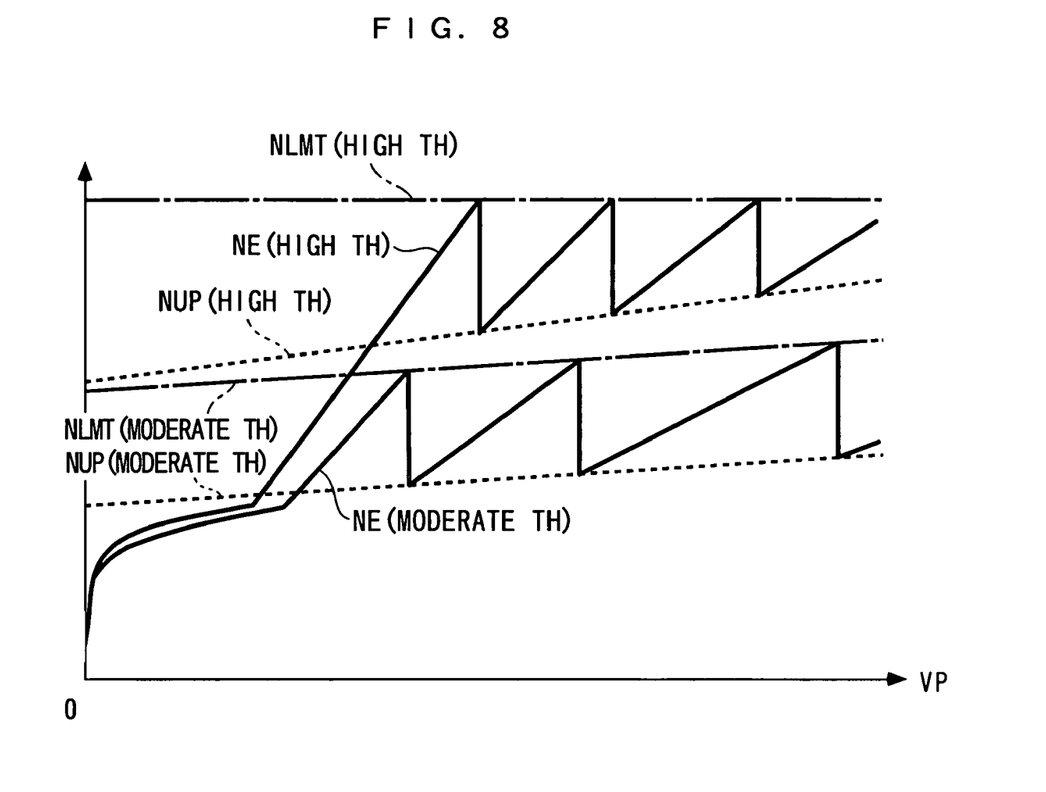
FIG. 8 is a diagram showing exemplary NLMT (high TH), NUP (high TH), NLMT (moderate TH), and NUP (moderate TH) tables in accordance with a throttle opening TH, and an exemplary change in engine rotational speed NE (high TH) and NE (moderate TH) based on the transmission characteristic in accordance with the throttle opening TH.

If the answer at step 20 is NO, i.e., when the current loop is the second loop or later after the transition to the AT mode, the routine proceeds to step 24, where an upper limit rotational speed NLMT (first predetermined value) is set in accordance with the vehicle speed VP and throttle opening TH. This upper limit rotational speed NLMT does not mean a normal upper rotational speed. of the internal combustion engine, but is set as a rotational speed at which the up-shift control should be conducted. FIG. 8 shows, as exemplary NLMT tables, an NLMT (high TH) table for large throttle opening TH, and an NLMT (moderate TH) table for moderate throttle opening TH in one-dot chain line. As shown in FIG. 8, in the NLMT table for large opening, the upper limit rotational speed NLMT is set to a certain large constant value which is an upper limit rotational speed value for the engine 2, irrespective of the magnitude of the vehicle speed VP. On the other hand, the NLMT table for moderate opening, the upper limit rotational speed NLMT is set to a value smaller than that of the NLMT table for large opening, and is set to linearly and slowly increase as the vehicle speed VP is higher. The NLMT table for moderate opening is set in this way because in the former, as the throttle valve opening TH is smaller, a request for acceleration is lower and the requested engine rotational speed NE is also lower, while in the latter, the requested engine rotational speed NE is higher as the vehicle speed VP is higher.

Next, the routine proceeds to step 25 in FIG. 5, where it is determined whether or not the engine rotational speed NE is equal to or higher than the upper limit rotational speed set at step 24. Since the answer at step 25 is NO due to a low engine rotational speed NE at the start of the AT mode, it is determined whether or not the up-shift flag F_UP is "1" (step 27). The execution of step 21 causes the answer to change to NO, in which case, step 23 is executed.

As is apparent from the foregoing control, the target rotational speed NCMD is set to the engine rotational speed NE in the CVT mode immediately before the switching to the AT mode immediately after the AT mode is started, and afterwards, the coefficient KNS is maintained at the value immediately after the switching unless the engine rotational speed exceeds the upper limit rotational speed NLMT. In this way, the engine rotational speed NE increases while the transmission ratio of the continuously variable transmission 40 is fixed to a value immediately after the switching to the AT mode, causing the vehicle speed VP to correspondingly increases in proportion to the engine rotational speed NE.

If the answer at step 25 is YES, i.e., when the engine rotational speed NE has reached the upper limit rotational speed NLMT, the up-shift flag F_UPS is set to "1," on the assumption that the up-shift should be executed (step 26), and the routine goes to step 28. Also, when the answer at step 27 is YES, i.e., when the execution of the up-shift causes the engine rotational speed NE to fall below the upper limit rotational speed NLMT, the routine goes to step 28 as well. At step 28, an up-shift rotational speed NUP (second predetermined value) is set in accordance with the vehicle speed VP and throttle opening TH. FIG. 8 shows NUP tables for large opening and for moderate opening, both in broken line, which form pairs with the aforementioned NLMT tables for large opening and for moderate opening, respectively. As shown in FIG. 8, in these NUP tables, the up-shift rotational speed NUP is set to a value smaller than the corresponding upper limit rotational speed NLMT. Also, for the same reason as described in connection with the aforementioned NLMT tables, the up-shift rotational speed NUP is set to a smaller value in the NUP table for moderate opening than the value in the NUP table for larger opening, and is set to linearly increase as the vehicle speed VP is higher.

Next, the routine proceeds to step 29 in FIG. 5, where it is determined whether or not the engine rotational speed NE is equal to or lower than the up-shift rotational speed NUP set at step 28. If the answer is NO, i.e., when the engine rotational speed NE does not fall to the up-shift rotational speed NUP after it has reached the upper limit rotational speed NLMT, an up-shift coefficient KNS is calculated by dividing the up-shift rotational speed NUP set at step 28 by the vehicle speed VP (step 30).

Next, the transmission response correction coefficient KTIPDNDR for the up-shift control is set in accordance with the vehicle speed VP, throttle opening TH, and transmission ratio (step 31), a torque transmitted through the starting clutch 50 is controlled to decrease (step 32), the engine torque is controlled to decrease (step 33), and the aforementioned step 23 is executed, followed by termination of this routine. In the foregoing manner, when the engine rotational speed NE reaches the upper limit rotational speed NLMT in the AT mode, step 30 is executed to set the coefficient KNS to a small value, and this KNS is used at step 23 to set the target rotational speed NCMD to an up-shift rotational speed NUP lower than the upper limit rotational speed NLMT. The up-shift is then started with the thus set target rotational speed NCMD.

The transmission response correction coefficient KTIPDNDR determines an actual changing speed of the transmission ratio to the target transmission shift in the up-shift, and is calculated by the following equation (1) which expresses a product of a vehicle correction term KVTUPAT and a throttle valve correction term KTHTUPAT, which are set based on the vehicle speed VP, throttle opening TH, and transmission ratio, and a transmission ratio correction term KVSSUP:

$$KTIPDNDR=KVTUPAT\cdot KTHTUPAT\cdot KVSSUP \quad (1)$$

Figure 9A:
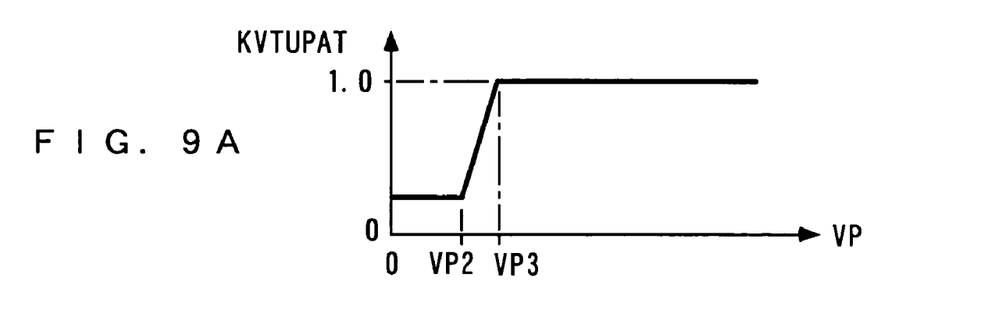
FIGS. 9A to 9C are diagrams showing three exemplary tables of correction terms KVTUPAT, KTHTUPA, and KVSSUP for calculating a transmission response correction coefficient KTIPDNDR.
Figure 9B:
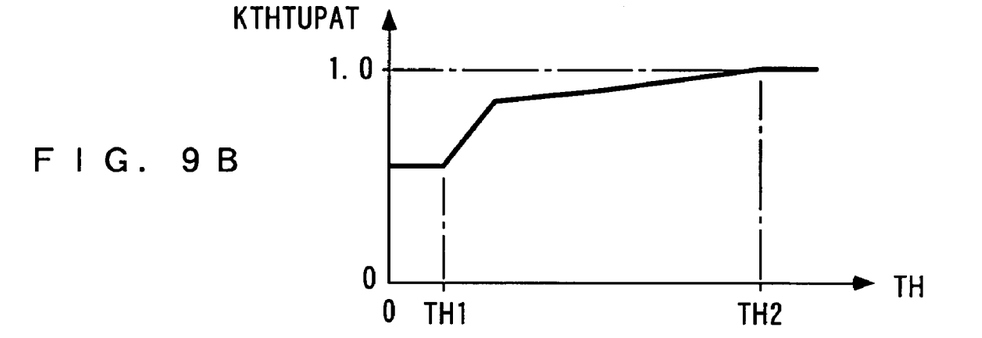
Figure 9C:
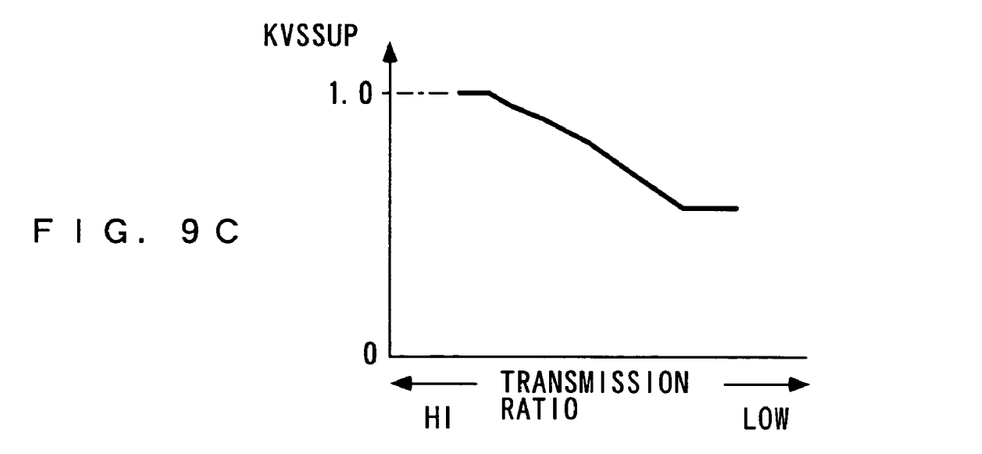

In this event, the vehicle speed correction term KVTUPAT is set by searching a table of FIG. 9A in accordance with the vehicle speed VP. In this table, the vehicle speed correction term KVTUPAT is set to a constant value smaller than 1.0 when the vehicle speed is equal to or lower than its first predetermined value VP2, and is set to 1.0 when the vehicle speed VP is equal to or higher than a second predetermined value VP3 (>VP2). This is because of requirements for suppressing a transmission shock caused by the vehicle speed VP susceptible to variations during acceleration when the vehicle speed VP is low. The throttle opening correction term KTHTUPAT in turn is set by searching a table of FIG. 9B in accordance with the throttle opening TH. In this table, the throttle opening correction term KTHTUPAT is set to a constant value smaller than 1.0 when the throttle opening TH is equal to or smaller than its first predetermined value TH1, set to 1.0 when the throttle opening TH is equal to or larger than a second predetermined value TH2 (>TH1), and set to a larger value as the throttle opening TH is larger between the first predetermined value TH1 and second predetermined value TH2. This is intended to enhance the responsibility of the transmission for a larger throttle opening TH with which a request for acceleration made by the operator is high. Further, the transmission ratio correction term KVSSUP is set by searching a table of FIG. 9C in accordance with the transmission ratio of the continuously variable transmission 40. In this table, the transmission ratio correction term KVSSUP is set to a smaller value as the transmission rate is deeper into the low speed side. This is because of requirements for suppressing a transmission shock which is more likely to occur when the transmission ratio is deeper into the low speed side, where the torque largely varies.

Figure 10:
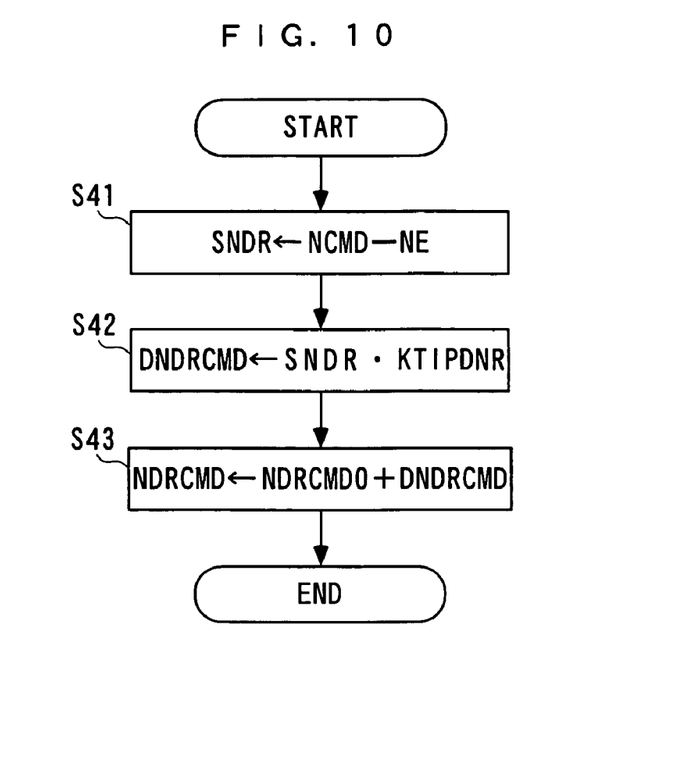
FIG. 10 is a flow chart for calculating a transmission command value NDRCMD for controlling the continuously variable transmission.

FIG. 10 is a flow chart of a routine for calculating a current control command value NDRCMD when the continuously variable transmission 40 is controlled in the AT mode such that the engine rotational speed NE reaches the target rotational speed NCMD. As illustrated in FIG. 10, in this routine, a difference SNDR is first calculated between the target rotational speed NCMD and engine rotational speed NE (step 41). Next, the product of the difference SNDR and the transmission response correction coefficient KTIPDNDR calculated at step 31 in FIG. 5, in accordance with the aforementioned equation (1), is set as an increment term DNDRCMD (step 42). In this event, the increment term DNDRCMD is calculated to be a negative value. Then, the increment term DNDRCMD calculated at step 42 is added to the preceding value NDRCMD0 of the control command value NDRCMD to calculate the current control command value NDRCMD (step 43). By controlling the transmission ratio of the continuously variable transmission 40 based on the control command value NDRCMD calculated in the foregoing manner, the engine rotational speed NE eventually converges to the target rotational speed NCMD at a changing rate in accordance with the transmission response correction term KTIPDNDR.

Figure 11:
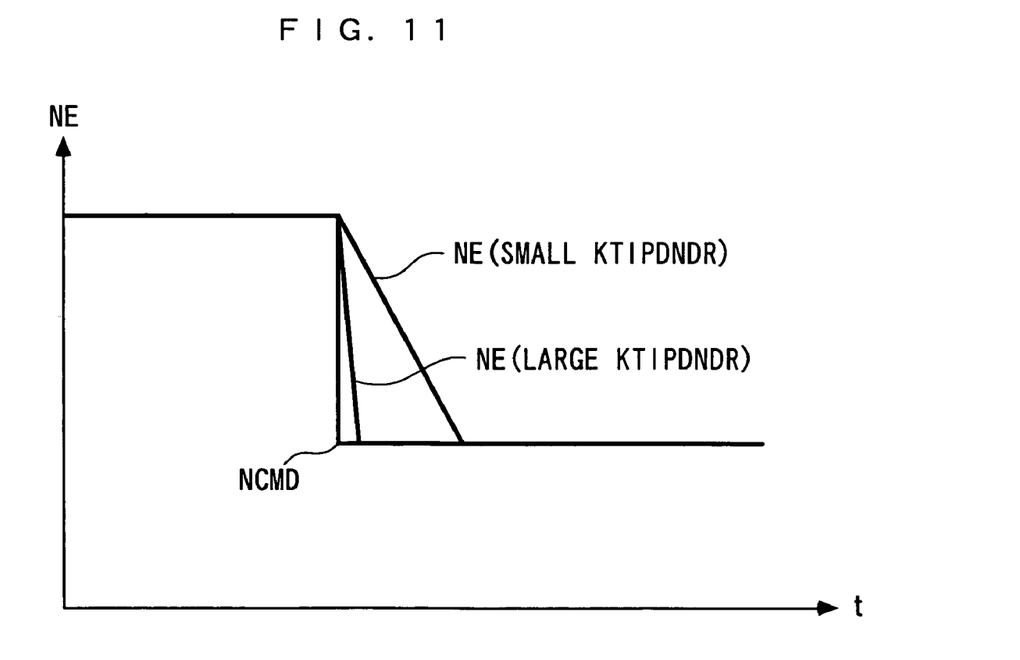
FIG. 11 is a diagram showing an exemplary response characteristic of the engine rotational speed NE to a target rotational speed NCMD.

FIG. 11 shows an exemplary response characteristic of the engine rotational speed NE in relation to the target rotational speed NCMD during the up-shift in the AT mode. As described above, at the start of the up-shift, the target rotational speed NCMD suddenly decreases. When the response correction coefficient KTIPDNDR is set to a relatively large value close to 1.0 for such a target rotational speed NCMD, the actual transmission ratio of the continuously variable transmission 40 is controlled based on the control command value NDRCMD, thereby causing the engine rotational speed NE to converge to the target rotational speed NCMD in a short time. On the other hand, when the transmission response correction coefficient KTIPDNDR is set to a relatively small value less than 1.0, the engine rotational speed NE converges to the target rotational speed NCMD more slowly than when the transmission response correction coefficient KTIPDNDR is large.

As described above, a good transmission feeling can be provide by controlling the actual transmission ratio of the continuously variable transmission 40 based on the control command value NDRCMD which is calculated using the transmission response correction coefficient KTIPDNDR determined in accordance with the vehicle speed VP, throttle opening TH, and the transmission ratio of the continuously variable transmission 40. Specifically, when the vehicle speed VP and throttle opening TH are relatively high, the transmission-ratio changes at a higher rate to reduce a transmission time, thereby making it possible to rapidly respond to a request for acceleration made by the operator. On the other hand, when the vehicle speed VP and throttle opening TH are relatively low, the transmission ratio changes at a lower rate to require a longer transmission time, thereby making it possible to reduce a transmission shock. Further, the transmission shock can be reduced as the transmission ratio is deeper into the low speed side, where the transmission rate changes at a lower rate to require a longer transmission time.

Also, as described above, during the up-shift in the AT mode, a torque transmitted through the starting clutch 50 is controlled to decrease at step 32, and the engine torque is controlled to decrease at step 33. Specifically, for reducing the torque transmitted through the starting clutch 50, the fastening force of the gear 43*a* with the counter shaft 43 by the starting clutch 50 is made lower than when the up-shift is not conducted, thereby reducing the torque transmitted through the starting clutch 50. On the other hand, for reducing the engine torque, the engine torque is made smaller than when the up-shift is not conducted by delaying an ignition timing of the engine 2, or reducing the amount of injected fuel. By executing the reduction of such transmitted torque and engine torque, variations in torque can be suppressed during the up-shift, thereby making it possible to reduce a transmission shock.

Turning back to FIG. 5, if the answer at step 29 is YES, i.e., when the engine rotational speed NE has reached the up-shift rotational speed NUP during the up-shift, the up-shift flag F_UPS is reset to "0," on the assumption that the up-shift should be terminated (step 34). Then, the transmission response correction coefficient KTIPDNDR is set to the normal value of one (step 35), the reduction in the torque transmitted through the starting clutch 50 and the engine torque, executed at steps 32 and 33, respectively, are terminated (steps 36, 37), and the aforementioned step 23 is executed, followed by termination of this routine.

Turning back to FIG. 4, when the answer at step 4 is YES, indicating the AT mode, the routine proceeds to step 9, where it is determined whether or not the engine rotational speed NE is equal to or higher than the upper limit rotational speed NLMT set at step 24 of FIG. 5. If the answer is YES, indicating that the engine rotational speed NE has reached the upper limit rotational speed NLMT, the routine proceeds to step 10, where it is determined whether or not the throttle opening changing amount DTH is smaller than a second predetermined amount DTHES (for example, −180%/sec). If the answer is NO, indicating DTH≧DTHES, this routine is terminated while the AT mode is maintained, because the operator is requesting for acceleration. On the other hand, if the answer at step 10 is YES, the AT mode is terminated, on the assumption that the operator no longer requests for acceleration (step 11), followed by termination of this routine.

If the answer at step 9 is NO, indicating that the engine rotational speed NE is below the upper limit rotational speed NLMT, it is determined whether or not the up-shift flag F_UPS is "1" (step 12), and it is also determined whether or not the engine rotational speed NE is equal to or lower than the up-shift rotational speed NUP set at step 28 of FIG. 5 (step 13). If the answer at step 12 is NO, indicating that the up-shift is not in progress, this routine is terminated while the AT mode is maintained. If the answer at step 13 is NO, i.e., when the engine rotational speed NE has not reached the up-shift rotational speed NUP during the up-shift control, this routine is terminated while the AT mode is maintained.

On the other hand, if the answers at steps 12 and 13 are both YES, an AT mode end rotational speed NES (fourth predetermined value) is set in accordance with the vehicle speed (step 14), and it is determined at subsequent step 15 whether or not the engine rotational speed NE is lower than the set AT mode end rotational speed NES. This AT mode end rotational speed NES is set based on an NES table shown in FIG. 7. In this NES table, the AT mode end rotational speed NES is set at a value smaller by a predetermined value than the aforementioned AT mode start rotational speed NSS when the vehicle speed VP is equal to or lower than the predetermined vehicle speed VP1. Also, the AT mode end rotational speed NES is set to suddenly increase as the vehicle speed VP is higher, when the vehicle speed VP exceeds the predetermined vehicle speed VP1, in a manner similar to the AT mode start rotational speed NSS. This is because the continuously variable transmission 40 is set at a relatively high transmission ratio on the high speed side during high speed running, where the vehicle speed VP exceeds the predetermined vehicle speed VP1, so that a better acceleration feeling can be provided by acceleration in the CVT mode than up-shift based acceleration in the AT mode.

Figure 7:
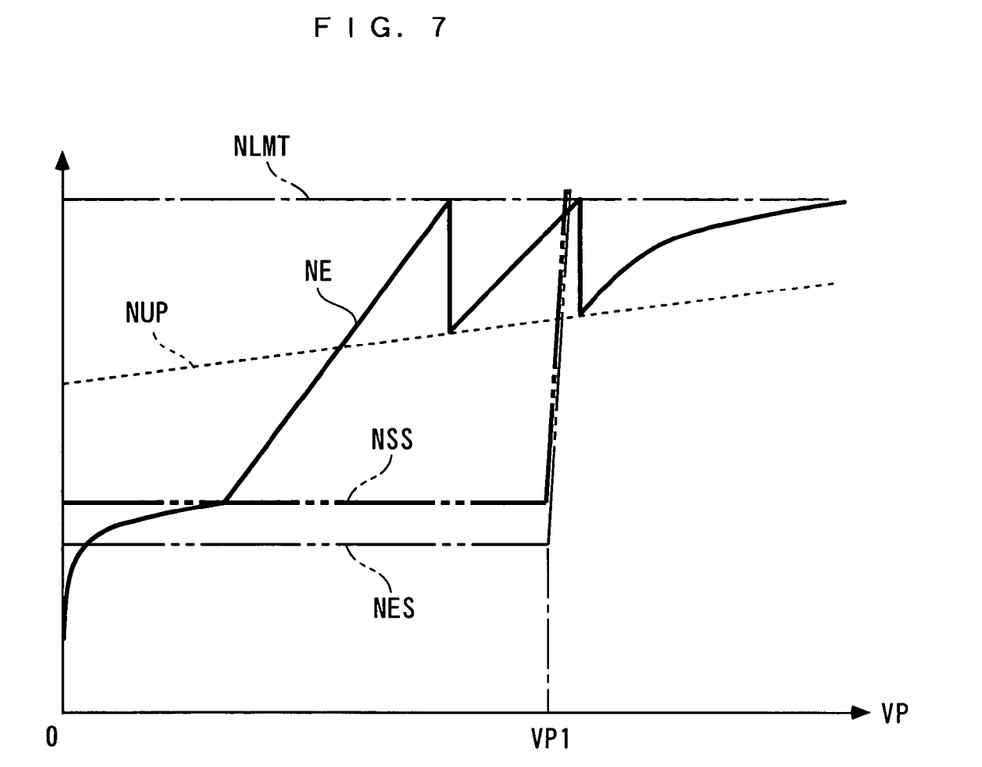
FIG. 7 is a diagram showing exemplary NSS and NES tables used in the routine of FIG. 4, exemplary NLMT and NUT tables used in the routines of FIGS. 4 and 5, and an exemplary change in engine rotational speed NE based on the transmission characteristic.

If the answer at step 15 is YES, indicating that the engine rotational speed NE decreases below the AT mode end rotational speed NES, the routine goes to step 11, where the AT mode is terminated. In this way, the transmission mode of the continuously variable transmission 40 transitions to the CVT mode. On the other hand, if the answer at step 15 is NO, this routine is terminated while the AT mode is maintained.

Referring now to FIG. 7, description will be made on the transmission characteristic during acceleration in the AT mode. Assume that at the start of the vehicle V, the transmission mode has been set to the CVT mode. As shown in FIG. 7, at the start of the vehicle V, the engine rotational sped NE once increases suddenly, and then slowly increases, and the vehicle speed VP also increases in association with the engine rotational sped NE. Then, as the engine rotational speed NE reaches the AT mode start rotational speed NSS (YES at step 6), causing the transmission mode to switch to the AT mode (step 8), the transmission ratio of the continuously variable transmission 40 is fixed to the transmission ratio in the preceding CVT mode, thereby causing the vehicle speed VP to increase in proportion to the rising engine rotational speed NE. As the engine rotational speed NE reaches the upper limit rotational speed NLMT (YES at step 25), the up-shift control is conducted (step 30). Thus, the engine rotational speed NE is reduced, and when it falls to the up-shift rotational speed NUP, the up-shift is terminated (YES at step 29). Subsequently, when the acceleration is further continued, the reduced engine rotational speed NE again increases, causing the vehicle speed VP to increase in proportion thereto. In the foregoing manner, in this embodiment, the vehicle speed VP increases through repetitions of an increase in the engine rotational speed NE and a reduction in the engine rotational speed NE by the up-shift during acceleration in the AT mode.

Also, as shown in FIG. 7, when the engine rotational speed NE is below the AT mode end rotational speed NES due to the up-shift at the time the engine rotational speed NE has reached the up-shift rotational speed NUP in the AT mode (YES at step 15), the AT mode is terminated (step 11), followed by a transition to the CVT mode. In this way, even when the transmission mode transitions to the CVT mode, the engine rotational speed NE can be increased to ensure a good acceleration feeling.

As described above in detail, according to this embodiment, upon switching from the CVT mode to the AT mode, the target rotational speed NCMD is set at the engine rotational speed NE in the CVT mode immediately before the switching, and the AT mode is started with a transmission ratio corresponding to the target rotational speed NCMD, so that the transmission mode can be smoothly switched without giving a discomfort to the operator. Also, when the engine rotational speed NE increases to the upper limit rotational speed NLMT due to a request for acceleration made by the operator in the subsequent AT mode, the up-shift is conducted to once reduce the engine rotational speed NE, and then the engine rotational speed increases again. Thus, unlike before, the engine rotational speed NE will not freeze but can appropriately respond to a request for acceleration from the user.

Also, since the upper limit rotational speed NLMT is set to a smaller value as the throttle opening TH is smaller, i.e., a request for acceleration made by the operator is lower, the engine rotational speed NE more readily reaches the upper limit rotational speed NLMT when the degree of the request for acceleration is moderate. As a result, the up-shift is more likely to be conducted, so that, unlike before, the operator will not be given a discomfort due to the continuously rising engine rotational speed when the degree of the request for acceleration is moderate. Further, since the upper limit rotational speed NLMT and up-shift rotational speed NUP are appropriately set in accordance with the vehicle speed VP and throttle opening TH, an appropriate transmission can be realized in accordance with the vehicle speed and request for acceleration. Particularly, when the degree of the request for acceleration is moderate, it is possible to reduce the frequency of changing transmission stages. From the foregoing, the drivability can be largely improved as compared with before.

Since the transmission mode is switched from the CVT mode to the AT mode when the target rotational speed NCMD and engine rotational speed NE exceed the AT mode start rotational speed NSS, the AT mode can be started after the engine rotational speed NE has been sufficiently increased, thereby preventing a discomfort given to the operator due to the AT mode which is started before the engine rotational speed NE has not been sufficiently increased.

Even when the engine rotational speed NE and target rotational speed NCMD exceed the AT mode start rotational speed in the CVT mode, the transmission mode is not switched to the AT mode if the changing amount DTH of the throttle opening TH is small, indicating that the operator has no intention to accelerate, the transmission mode will not be switched to the AT mode, thus making it possible to ensure that the transmission mode is prevented from switching to the AT mode against the operator's will. Also, even if the engine rotational speed has reached the upper limit rotational speed NLMT in the AT mode, the AT mode is terminated and the transmission mode transitions to the CVT mode when the changing amount DTH of the throttle opening TH is small. It is therefore possible to appropriately and rapidly respond to the operator's intention to decelerate to smoothly decelerate the vehicle V.

It should be understood that the present invention is not limited to the embodiment described above, but may be practiced in a variety of manners. For example, while the foregoing embodiments employ both the vehicle speed VP and throttle valve TH as parameters for setting the upper limit rotational speed NLMT and up-shift rotational speed NUP, only one of them may be used. Alternatively, another proper parameter indicative of an engine load may be employed instead of the throttle opening TH. Also, at step 6, the transmission mode is switched from the CVT mode to the AT mode under the condition that both the target rotational speed NCMD and engine rotational speed NE exceed the AT mode start rotational speed NSS. Alternatively, the switching may be made under the condition that one of the target rotational speed NCMD and engine rotational speed NE exceeds the AT mode start rotational speed NSS. Further, when the up-shift is conducted in the AT mode, all of the vehicle speed VP, throttle opening TH, and transmission ratio are used as parameters for setting the transmission response correction coefficient KTIPDNDR for determining an actual changing rate of the transmission ratio to the target transmission ratio, but one or two of these parameters may be used. Alternatively, another proper parameter indicative of an engine load may be employed instead of the throttle opening TH. Also, in the CVT mode, the transmission mode may be switched to the AT mode by the operator himself who operates a switch or the like.

While the foregoing embodiment has shown an example which has the CVT mode and AT mode for transmission modes of the continuously variable transmission, the present invention may be applied to a control apparatus for a continuously variable transmission which has in combination a stepped manual transmission mode for setting a transmission ratio to one of a plurality of predetermined transmission ratios in accordance with the operator's will to a change in transmission stage. Otherwise, the present invention can be modified in detailed configuration as appropriate without departing from the spirit and scope of the invention as defined by the appended claims.

What is claimed is:

1. A control apparatus for a continuously variable transmission capable of continuously transmitting the output of an internal combustion engine equipped in a vehicle, said control apparatus configured to control the transmission ratio of said continuously variable transmission in one of transmission modes including a continuously variable transmission mode for continuously setting the transmission ratio of said continuously variable transmission and a stepped transmission mode for setting the transmission ratio on a step-by-step basis, said control apparatus comprising:

operating condition detecting means for detecting an operating condition of said vehicle;

target transmission ratio setting means for setting a target transmission ratio in accordance with a detected operating condition of said vehicle;

transmission ratio control means for controlling the transmission ratio of said continuously variable transmission to reach the set target transmission ratio;

transmission mode switching means for switching the transmission mode between said continuously variable transmission mode and said stepped transmission mode; and rotational speed detecting means for detecting the rotational speed of said internal combustion engine, wherein said target transmission ratio setting means is operable when the transmission mode is switched from said continuously variable transmission mode to said stepped transmission mode to set said target transmission ratio to a transmission ratio in said continuously variable transmission mode immediately before the switching, and is operable when the rotational speed of said internal combustion engine subsequently reaches a first predetermined value to set said target transmission ratio to a transmission ratio on a high speed side such that the rotational speed of said internal combustion engine is reduced to a second predetermined value smaller than said first predetermined value, wherein said vehicle comprises an operating means operated by an operator of said vehicle for changing the transmission ratio of said continuously variable transmission, wherein said operating condition detecting means includes running state detecting means for detecting whether or not said vehicle is in a predetermined starting state, a predetermined stopping state, or a predetermined sudden accelerating state, and whether or not said operating means is in a predetermined operating state, and wherein said transmission mode switching means is responsive to one of said predetermined starting state, stopping state, sudden accelerating state of said vehicle and said predetermined operating state detected by said running state detecting means for prohibiting execution of said stepped transmission mode.

2. A control apparatus for a continuously variable transmission of a vehicle according to claim 1, wherein said operating condition detecting means includes:

vehicle speed detecting means for detecting a speed of said vehicle; and load detecting means for detecting a load on said internal combustion engine, wherein said target transmission ratio setting means sets said first and second predetermined values in accordance with at least one of the speed of said vehicle and the load on said internal combustion engine.

3. A control apparatus for a continuously variable transmission of a vehicle according to claim 1, further comprising:

target rotational speed setting means for setting a target rotational speed of said internal combustion engine for bringing the transmission ratio of said continuously variable transmission to said target transmission ratio, wherein said transmission mode switching means is operable when the transmission mode is said continuously variable transmission mode to switch the transmission mode to said stepped transmission mode when at least one of said set target rotational speed and the rotational speed of said internal combustion engine exceeds a third predetermined value.

4. A control apparatus for a continuously variable transmission of a vehicle according to claim 1, wherein:

said operating condition detecting means includes throttle opening detecting means for detecting an opening of a throttle valve of said internal combustion engine, wherein said transmission mode switching means is operable when the transmission mode is said continuously variable transmission mode to prohibit switching to said stepped transmission mode when the opening of said throttle valve is reduced.

5. A control apparatus for a continuously variable transmission of a vehicle according to claim 1, wherein:

said operating condition detecting means includes throttle opening detecting means for detecting the opening of the throttle of said internal combustion engine, said transmission mode switching means is operable when the transmission mode is said stepped transmission mode to switch the transmission mode to said continuously variable transmission mode when the opening of said throttle valve is reduced at the time the rotational speed of said internal combustion engine reaches said first predetermined value.

6. A control apparatus for a continuously variable transmission of a vehicle according to claim 1, wherein:

said transmission mode switching means is operable when the transmission mode is said stepped transmission mode to switch the transmission mode to said continuously variable transmission mode when the rotational speed is lower than a fourth predetermined value at the time the rotational speed reaches said second predetermined value.

7. A control apparatus for a continuously variable transmission of a vehicle according to claim 1, wherein said operating condition detecting means includes:

vehicle speed detecting means for detecting a speed of said vehicle; and load detecting means for detecting a load on said internal combustion engine, said control apparatus further comprising correcting means operable when the transmission mode is said stepped transmission mode to correct a rate at which the transmission ratio of said continuously variable transmission changes to said transmission ratio on the high speed side in accordance with at least one of the speed of said vehicle, the load on said internal combustion engine, and the transmission ratio of said continuously variable transmission after the rotational speed of said internal combustion engine has reached said first predetermined value.

8. A control apparatus for a continuously variable transmission of a vehicle according to claim 1, wherein:

said internal combustion engine comprises a clutch disposed between said internal combustion engine and driving wheels of said vehicle for transmitting a torque of said internal combustion engine to said driving wheels, and said control apparatus further comprises transmitted torque reducing means for reducing the torque transmitted through said clutch during a change to said transmission ratio on the high speed side below the torque applied when such a change is not made.

9. A control apparatus for a continuously variable transmission of a vehicle according to claim 1, further comprising input torque reducing means for reducing an input torque applied to said continuously variable transmission during a change to said transmission ratio on the high speed side below the input torque applied when such a change is not made.

* * * * *